(12) United States Patent
Nakata et al.

(10) Patent No.: US 7,639,385 B2
(45) Date of Patent: Dec. 29, 2009

(54) IMAGE PROCESSOR, METHOD FOR INFORMING STATUS CHANGE OF IMAGE PROCESSOR AND COMPUTER PROGRAM PRODUCT

(75) Inventors: Hironobu Nakata, Itami (JP); Masakazu Murakami, Itami (JP); Kazumi Sawayanagi, Itami (JP); Minako Kobayashi, Ikeda (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 816 days.

(21) Appl. No.: 11/026,085

(22) Filed: Jan. 3, 2005

(65) Prior Publication Data

US 2006/0077425 A1 Apr. 13, 2006

(30) Foreign Application Priority Data

Oct. 7, 2004 (JP) .............................. 2004-295446

(51) Int. Cl.
- G06F 3/12 (2006.01)
- G06F 3/00 (2006.01)
- H04N 1/00 (2006.01)

(52) U.S. Cl. .................... 358/1.16; 358/1.15; 399/80

(58) Field of Classification Search ................ 358/116, 358/115, 505, 402, 1.17, 1.16, 1.15; 399/80, 399/81, 82; 709/217
See application file for complete search history.

(56) References Cited

U.S. PATENT DOCUMENTS

| | | | | |
|---|---|---|---|---|
| 5,414,494 A | * | 5/1995 | Aikens et al. | 399/1 |
| 5,467,435 A | * | 11/1995 | Douglas et al. | 358/1.15 |
| 5,935,262 A | * | 8/1999 | Barrett et al. | 714/46 |
| 6,216,113 B1 | | 4/2001 | Aikens et al. | |
| 7,120,674 B1 | * | 10/2006 | Motoyama et al. | 709/217 |
| 2002/0089693 A1 | | 7/2002 | Maruyama | |
| 2002/0095508 A1 | * | 7/2002 | Okazawa | 709/230 |

(Continued)

FOREIGN PATENT DOCUMENTS

EP 1083486 A1 * 3/2001

(Continued)

OTHER PUBLICATIONS

Facsimile processing for a message server; Likforman-Sulem, L; Cuenca, B; Database and Expert Systems Applications, 1999. Proceedings. Tenth International Workshop on Sep. 1-3, 1999 pp. 539-543.*

(Continued)

*Primary Examiner*—Kimberly A Williams
(74) *Attorney, Agent, or Firm*—Buchanan Ingersoll & Rooney PC

(57) ABSTRACT

An image forming device includes a user job history database for storing execution condition information that indicates an execution condition of the job in relationship with user identification information for distinguishing a user who made the instruction for each executed job, a device structure detection portion for detecting a change in a state of the image processor, a notification target determination portion for determining a notification target user who is a user to be notified of the change in accordance with the execution condition information and the user identification information stored in the user job history database, and a new function notification portion for notifying the change to the determined notification target user.

17 Claims, 14 Drawing Sheets

PLEASE ENTER YOUR USER ID AND PASSWORD.

USER ID : ☐

PASSWORD : ☐

1h1   HG1

U.S. PATENT DOCUMENTS

| | | | |
|---|---|---|---|
| 2002/0129141 A1* | 9/2002 | Sogabe et al. | 709/224 |
| 2002/0147858 A1* | 10/2002 | Motoyama et al. | 709/318 |
| 2003/0018829 A1* | 1/2003 | Carney et al. | 709/321 |
| 2003/0086106 A1* | 5/2003 | Parry | 358/1.13 |
| 2003/0093710 A1 | 5/2003 | Hashimoto et al. | |
| 2003/0112472 A1 | 6/2003 | Eguchi et al. | |
| 2003/0135541 A1 | 7/2003 | Maeda et al. | |
| 2003/0200035 A1 | 10/2003 | Niki | |
| 2004/0145973 A1* | 7/2004 | Nagashima | 368/107 |
| 2005/0270586 A1 | 12/2005 | Hashimoto | |

FOREIGN PATENT DOCUMENTS

| | | | |
|---|---|---|---|
| GB | 2331387 A * | 5/1999 | |
| JP | 07-200776 | 8/1995 | |
| JP | 09-305334 | 11/1997 | |
| JP | 10-098575 | 4/1998 | |
| JP | 11-327854 | 11/1999 | |
| JP | 2001-057614 | 2/2001 | |
| JP | 2002-123380 | 4/2002 | |
| JP | 2002-169683 | 6/2002 | |
| JP | 2002-196915 | 7/2002 | |
| JP | 2002-259100 | 9/2002 | |
| JP | 2002-297349 | 10/2002 | |
| JP | 2002-366319 | 12/2002 | |
| JP | 2003-001909 | 1/2003 | |
| JP | 2003-150359 | 5/2003 | |
| JP | 2003-189041 | 7/2003 | |
| JP | 2004-005543 A | 1/2004 | |
| JP | 2004-048604 | 2/2004 | |
| JP | 2004-112715 A | 4/2004 | |
| JP | 2005-333352 A | 12/2005 | |
| WO | WO 9956460 A1 * | 11/1999 | |
| WO | WO 02/010938 A1 | 2/2002 | |

OTHER PUBLICATIONS

Intelligent seamless messaging. Meech, J F; Abu-Hakima, S; SMC'98 Conference Proceedings. 1998 IEEE International Conference on Systems, Man, and Cybernetics, 1998, vol. 2, p. 1241-4.*

All together now: voice mail, fax, email. Rosenberg, A M; Business Communications Review, Nov. 1995 vol. 25, No. 11, p. 60-4.*

Official Communication from Japanese Patent Office dated Jul. 4, 2006.

Notification of the First Office Action in CN 200510104036.5 dated May 23, 2008, and English Translation thereof.

A Notification of Reasons for Refusal issued in a corresponding Japanese application, and translation thereof.

Notification of Reasons for Refusal issued in corresponding Japanese Patent Application No. 2006-245575, and translation thereof.

* cited by examiner

| USER ID | PASSWORD | ELECTRONIC MAIL ADDRESS |
|---|---|---|
| 100 | 45625 | sato@~.co.jp |
| 101 | 37864 | suzuki@~.co.jp |
| 102 | 95102 | tanaka@~.co.jp |
| 103 | 75689 | fujita@~.co.jp |
| 104 | 54984 | murata@~.co.jp |
| ⋮ | ⋮ | ⋮ |

| JOB ID | USER ID | APPLICATION | NUMBER OF ORIGINAL SHEETS | NUMBER OF COPIES | SIDES OF ORIGINAL | SIDES OF OUTPUT | SORT | FINISH | EXECUTION RESULT | CAUSE OF ABNORMAL END |
|---|---|---|---|---|---|---|---|---|---|---|
| J001 | 100 | PRINT | 1 | 1 | - | 0: SINGLE | 0: NO | 3: 4 in 1 | 0: NORMALLY COMPLETED | 0: NO |
| J002 | 101 | COPY | 5 | 1 | 0: SINGLE | 0: SINGLE | 0: NO | 0: NO | 0: NORMALLY COMPLETED | 0: NO |
| J003 | 107 | COPY | 2 | 5 | 0: SINGLE | 0: SINGLE | 1: YES | 1: STAPLE | 1: FORCED CANCELLATION EXECUTION | 0: NO |
| J004 | 105 | SCAN | 1 | - | 0: SINGLE | - | - | - | 0: NORMALLY COMPLETED | 0: NO |
| J005 | 102 | COPY | 3 | 2 | 1: DOUBLE | 0: SINGLE | 1: YES | 0: NO | 1: FORCED CANCELLATION EXECUTION | 0: NO |
| J006 | 101 | SCAN | 2 | - | 1: DOUBLE | - | - | - | 0: NORMALLY COMPLETED | 0: NO |
| J007 | 100 | COPY | 5 | 3 | 1: DOUBLE | 0: SINGLE | 0: NO | 0: NO | 0: NORMALLY COMPLETED | 0: NO |
| J008 | 103 | COPY | 10 | 1 | 0: SINGLE | 0: SINGLE | 0: NO | 2: 2 in 1 | 0: NORMALLY COMPLETED | 0: NO |
| J009 | 109 | COPY | 15 | 1 | 0: SINGLE | 0: SINGLE | 0: NO | 0: NO | 0: NORMALLY COMPLETED | 0: NO |
| J010 | 109 | COPY | 15 | 9 | 0: SINGLE | 0: SINGLE | 0: NO | 0: NO | 0: NORMALLY COMPLETED | 0: NO |
| J011 | 104 | COPY | 2 | 1 | 0: SINGLE | 0: SINGLE | 0: NO | 0: NO | 2: NEAR EMPTY | 0: NO |
| J012 | 110 | SCAN | 1 | - | 0: SINGLE | - | - | - | 3: ABNORMAL END | 1: JAM OF AN ORIGINAL SHEET |

FIG. 7

PLEASE ENTER YOUR USER ID AND PASSWORD.

USER ID :

PASSWORD:

1h1    HG1

FIG. 12
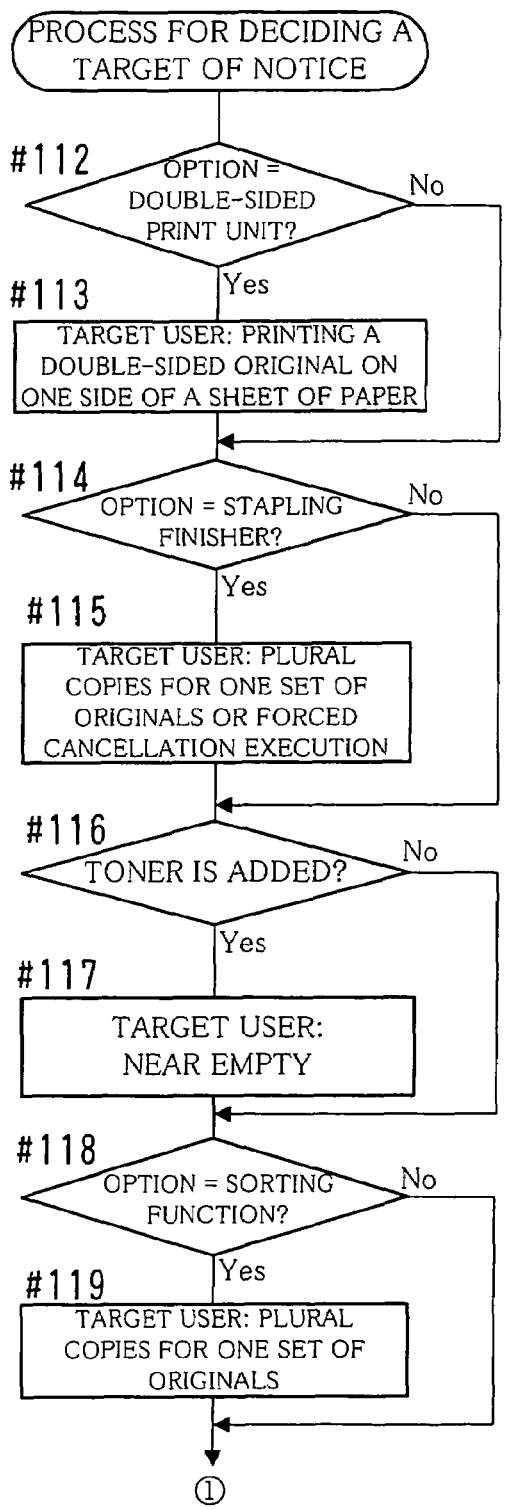
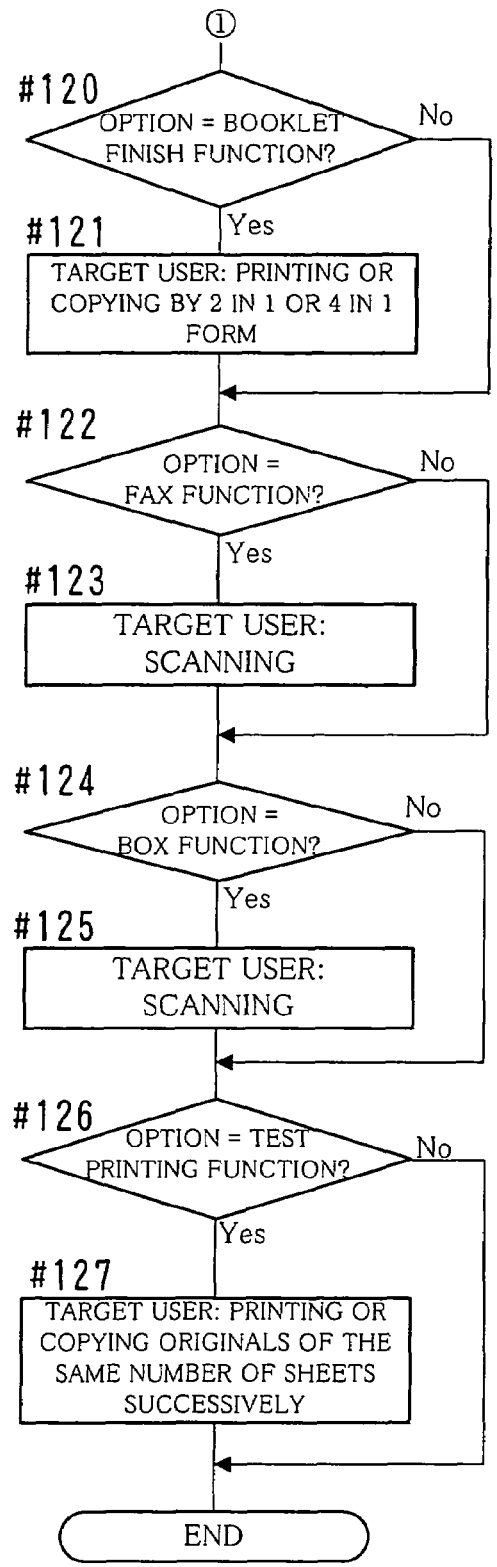

IMAGE PROCESSOR, METHOD FOR INFORMING STATUS CHANGE OF IMAGE PROCESSOR AND COMPUTER PROGRAM PRODUCT

This application is based on Japanese Patent Application No. 2004-295446 filed on Oct. 7, 2004, the contents of which are hereby incorporated by reference.

BACKGROUND OF THE INVENTION

1. Field of the Invention

The present invention relates to an image processor such as multifunction peripherals that can send data to a terminal device of a user via a network and a method for controlling the image processor.

2. Description of the Prior Art

Recently, an image processor such as a printer or a copying machine is equipped with various functions. For example, an image processor is proposed that has a scanner function, a FAX function, or a document server (box) function adding to a conventional copy function and a network printing function. Such an image processor is called a multifunction device or multifunction peripherals (MFP).

Some image processors have all the above-mentioned functions as standard functions, while other image processors support a part of the functions as optional functions or extension functions. There is also a case where a new function is developed and becomes available after marketing of the image processor has started. Particularly, along with recent boost in performance of CPU and a large capacity of memory available at a low cost, it has become easy to realize all or a part of the image processing or the control processing of each unit by software. As a result, extension of functions of the image processor becomes easier than before, and a new function can be readily provided to a user even after marketing of the image processor has started.

In addition, one image processor such as an MFP may be used by many users. Therefore, it is required to inform users of any status change in the image processor efficiently. There are proposed several methods for informing users of a status change as follows.

Japanese unexamined patent publication No. 2002-259100 teaches a method in which when setting of rights for using a printer device is changed, a notice of the changed matter is provided to users whose rights for usage have been changed. Japanese unexamined patent publication No. 2002-196915 teaches a method in which device information is obtained from a printer device by a regular polling or the like, and if a state of the printer device is changed, a notice of the changed matter is provided to an information processor by electronic mail.

Japanese unexamined patent publication No. 2002-123380 teaches a method in which if setting information of a printer is changed, the setting information after the change is automatically sent to a host computer. Japanese unexamined patent publication No. 2003-189041 teaches a method in which when setting of an Internet facsimile device is updated from a remote place by using electronic mail, the Internet facsimile device provide information about whether or not the update has succeeded and the updated matter to the person who made the update.

Japanese unexamined patent publication No. 2003-150359 teaches a method in which when detecting an abnormal state in a device performing a job, an attribution of the transmission destination of the job is discriminated. Then, if a result is obtained that indicates there is not the user who made the transmission nearby, information indicating the abnormal state is provided to a person who is near the device. Japanese unexamined patent publication No. 2002-169683 teaches a method in which if an error is generated, all jobs that can be affected by the error are determined depending on a type of the error. Devices that have asked for performing the jobs are determined. Then, an error message is sent to the devices.

Japanese unexamined patent publication No. 11-327854 teaches a method in which when a print error is generated, a user who is starting the current job is informed of the print error. After that, when the recovery is performed, all registered users are informed of the recovery. Japanese unexamined patent publication No. 9-305334 teaches a method in which when an abnormal operation of a printer is detected, it is monitored whether the abnormal operation has resolved or not after a predetermined time has passed. Then, if the abnormal operation has not resolved yet, error information is sent to a host computer that sent the print data that was being processed at the time when the abnormal operation was detected or a host computer that sent print data before or after the time.

In addition, a method for expanding functions of the device is also proposed. For example, Japanese unexamined patent publication No. 2002-366319 teaches a method in which updating of software is performed automatically during a print processor is in an energy saving state.

However, according to the conventional method as described in each of the above-mentioned patent publication, it is difficult to introduce efficiently a newly added function of the image processor to users who use the image processor. Namely, in the methods described in Japanese unexamined patent publications No. 2002-259100, No. 2002-169683 and No. 9-305334, users affected directly by setting change or an error are informed of information about the setting change or the error. However it is difficult to decide which user should be informed of a newly added function by these methods.

In the methods described in Japanese unexamined patent publication No. 2002-196915, No. 2003-150359 and No. 11-327854, information about an update or an error is provided to all users. However, it is also difficult to decide which user should be informed of a newly added function by these methods. In addition, some users may feel it burdensome to receive all notices because they are not always important to each of the users.

It is also difficult to decide which user should be informed for efficiency by Japanese unexamined patent publication No. 2002-123380, No. 2003-189041 and No. 2002-366319.

SUMMARY OF THE INVENTION

An object of the present invention is to inform a user efficiently of a change such as an addition of a new function to an image processor.

The image processor according to an aspect of the present invention is an image processor for executing a job of a process related to an image in accordance with an instruction given by a user. The image processor includes a storage portion for storing execution condition information for each job, the execution condition information indicating an execution condition of the job in relationship with user identification information for distinguishing a user who made the instruction, a status change detection portion for detecting a change in a state of the image processor, a notification target determination portion for determining a notification target user who is a user to be notified of the change in accordance with the execution condition information and the user identification information stored in the storage portion, and a notification portion for notifying the change to the determined notification target user.

The change is, for example, addition of a new function to the image processor, or supplementation of a consumable item to the image processor. In the former case, the notification target determination portion determines a user who needs the added function as the notification target user. In the latter case, the notification target determination portion determines a user who made the job that was executed when remaining quantity of the consumable item is less than a predetermined quantity as the notification target user.

According to the present invention, when a change such as addition of a new function is generated in an image processor, a notice of the change can be sent to a user efficiently.

BRIEF DESCRIPTION OF THE DRAWINGS

FIG. 5 shows an example of a user information database.

FIG. 6 shows an example of a user job history database.

FIG. 7 shows an example of a log-in screen.

FIG. 12 is a flowchart showing an example of a flow of a process for deciding a target of notice.

DESCRIPTION OF THE PREFERRED EMBODIMENTS

Hereinafter, the present invention will be explained more in detail with reference to embodiments and drawings.

Figure 1:
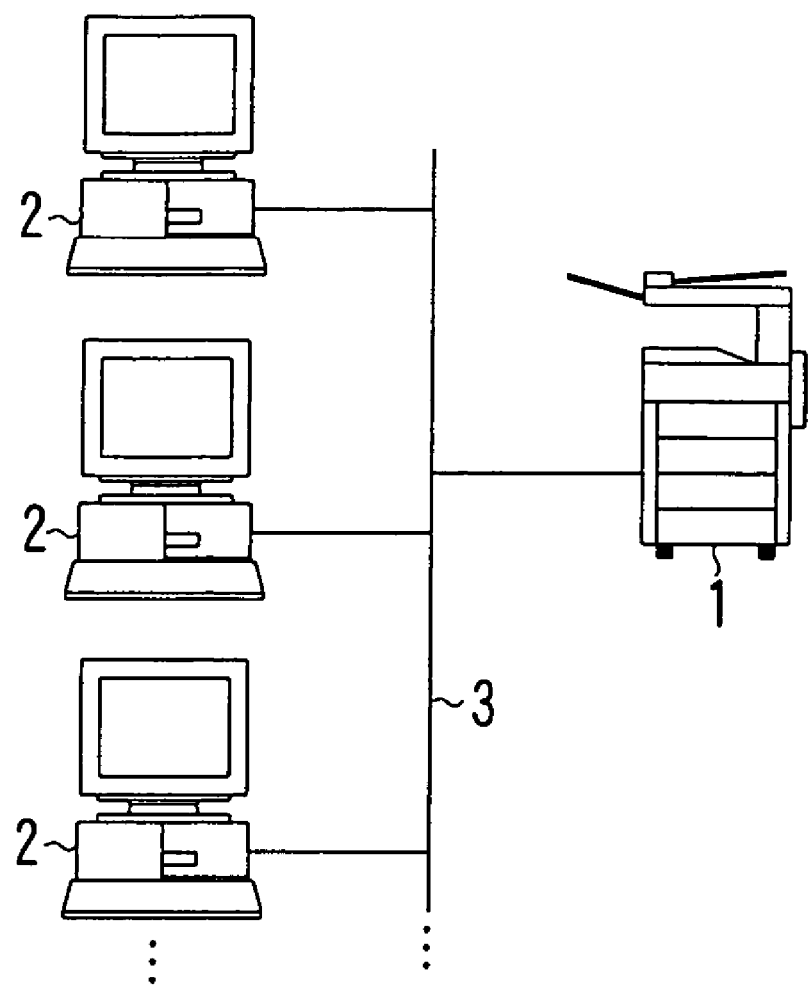
FIG. 1 shows an example of an overall structure of a network system equipped with an image forming device according to the present invention.
Figure 2:
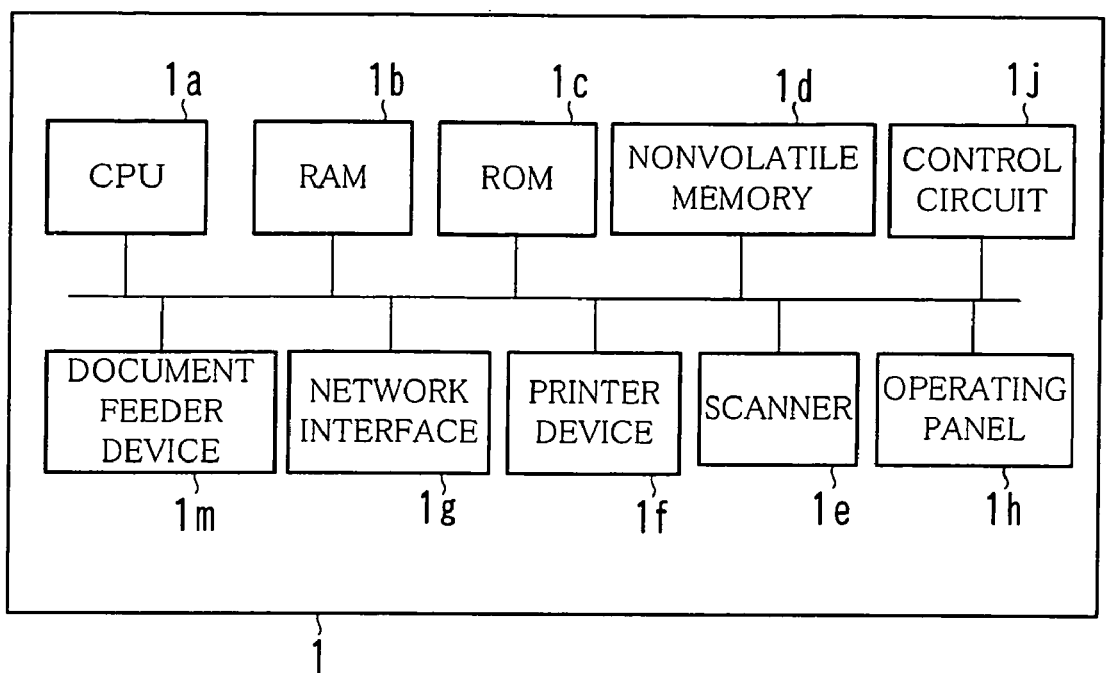
FIG. 2 shows an example of a hardware structure of the image forming device.
Figure 3:
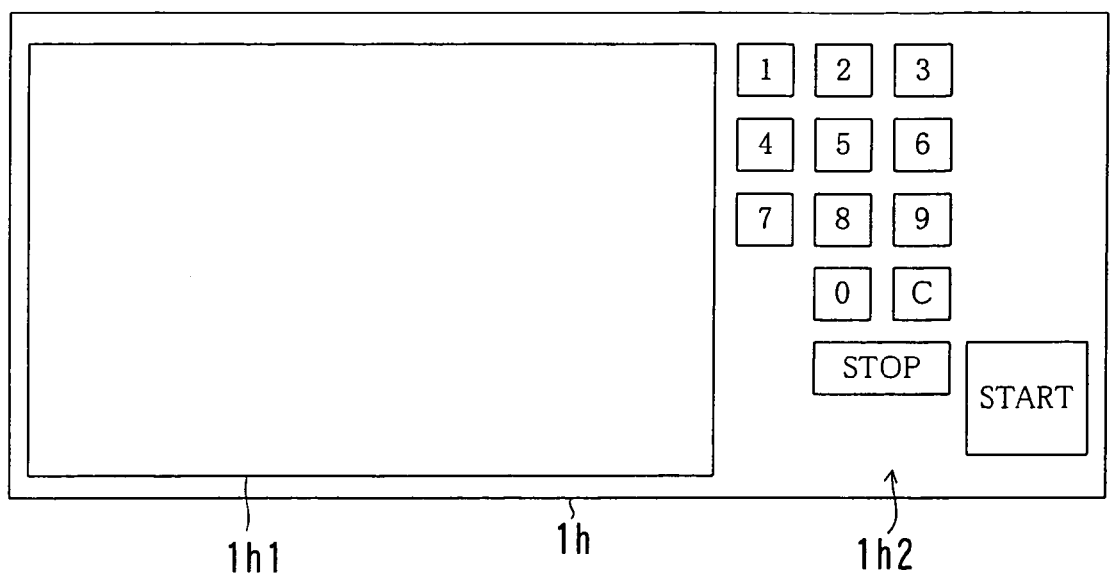
FIG. 3 shows an example of a structure of an operating panel.
Figure 4:
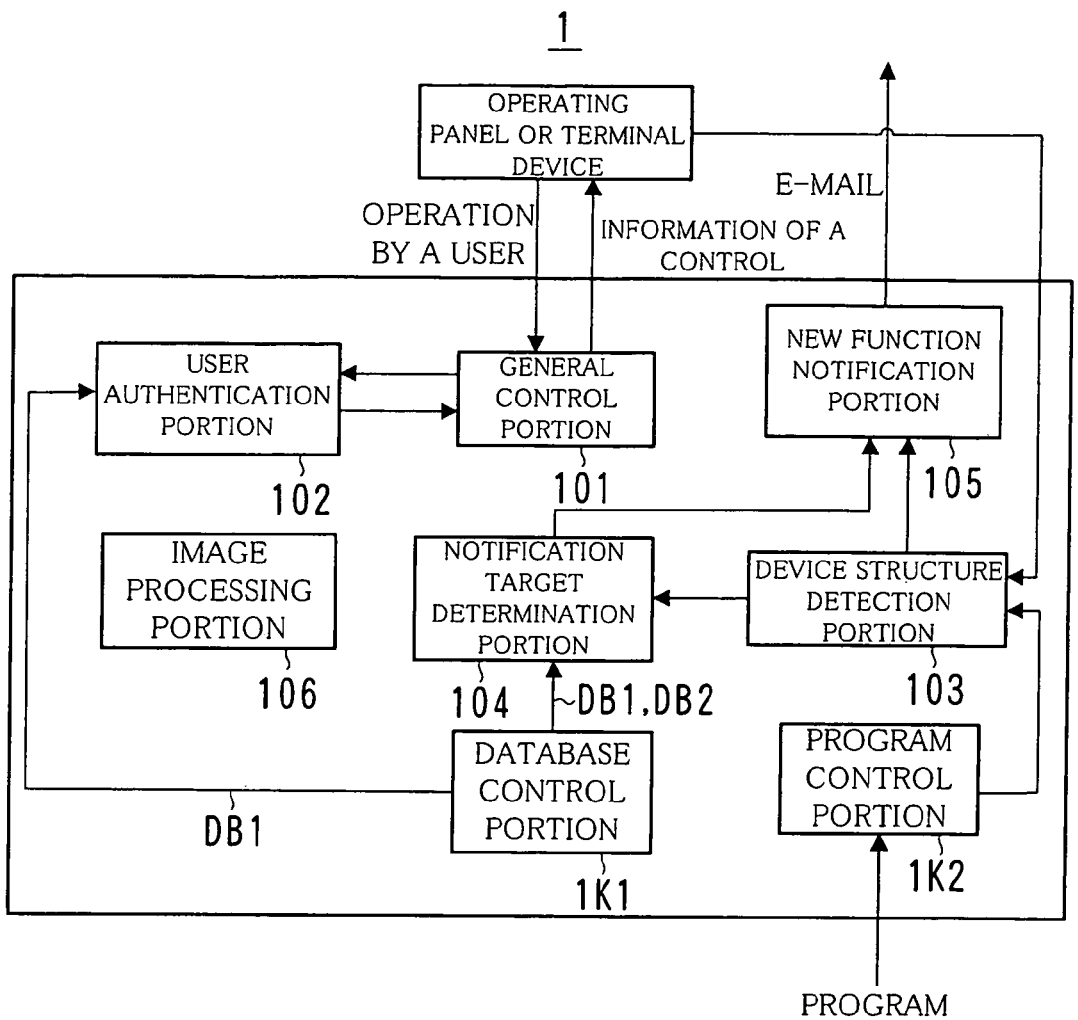
FIG. 4 shows an example of a functional structure of the image forming device.

FIG. 1 shows an example of an overall structure of a network system equipped with an image forming device 1 according to the present invention, FIG. 2 shows an example of a hardware structure of the image forming device 1, FIG. 3 shows an example of a structure of an operating panel 1*h*, FIG. 4 shows an example of a functional structure of the image forming device 1.

The image forming device 1 according to the present invention is connected to a terminal device 2 via a communication line 3 as shown in FIG. 1. As the communication line 3, a LAN, the Internet, a public telephone line or a private line can be used. As a protocol, FTP (File Transfer Protocol), POP (Post Office Protocol) or SMTP (Simple Mail Transfer Protocol) can be used.

The image forming device 1 is a device including integrated functions of a copy, network printing, a scanner or the like. This device may be called a multifunction device or a MFP (Multi Function Peripherals). This image forming device 1 can support extension of functions by adding hardware or software. For example, it is possible to add various functions including a major function such as a FAX function or a document server function and a minor function such as a function of sorting a printed matter while a process of copy or network printing or a function of stapling a printed matter.

As shown in FIG. 2, the image forming device 1 includes a CPU 1*a*, a RAM 1*b*, a ROM 1*c*, a nonvolatile memory 1*d*, a scanner 1*e*, a printer device 1*f*, a network interface 1*g*, an operating panel 1*h*, a document feeder device 1*m*, and a control circuit 1*j*.

The scanner 1*e* is a device for reading images such as photographs, characters, pictures, charts or the like on a original sheet (hereinafter, may be referred to simply as an "original") optically so as to generate image data. The document feeder device 1*m* is a device for feeding one or more set original sheets to the scanner 1*e*. In this embodiment, the document feeder device 1*m* is an automatic double-sided document feeder device that can feed an original that includes images to be read on both sides of a sheet of paper to the scanner 1*e*. Hereinafter, an original including images to be processed on both sides of a sheet of paper is referred to as a "double-sided original", while an original including images to be processed on one side is referred to as a "single-sided original".

The printer device 1*f* is a device for printing an image read by the scanner 1*e* or an image of image data received from the terminal device 2 or the like on a sheet of paper.

The operating panel 1*h* includes a display device 1*h*1 and an operating button unit 1*h*2 having a plurality of operating buttons as shown in FIG. 3.

The operating button unit 1*h*2 includes a plurality of keys for entering numbers, characters, symbols or the like, a sensor for recognizing a pressed key, a transmission circuit for sending a signal indicating the recognized key to the CPU 1*a*.

The display device 1*h*1 displays a screen for giving messages or instructions to a user who operates the image forming device 1, a screen for the user to enter setting contents and process contents, a screen for showing an image formed by the image forming device 1 and a process result, or the like. In this embodiment, a touch panel is used as the display device 1*h*1. Therefore, the display device 1*h*1 has a function for detecting a position where the user touches by his or her finger on the touch panel, and for sending a signal that indicates a detection result to the CPU 1*a*.

In this way, the operating panel 1*h* works as a user interface for the user who operates the image forming device 1 directly. Note that an application program and a driver are installed in the terminal device 2 for giving an instruction to the image forming device 1. Therefore, the user can operate the image forming device 1 by using the terminal device 2 from a remote place.

The network interface 1*g* shown in FIG. 2 is a device for communicating with the terminal device 2. A network interface card (an NIC), a modem, a terminal adapter (TA) or the like is used as the network interface 1*g*.

The control circuit 1*j* is a circuit for controlling a device such as a nonvolatile memory 1*d*, a scanner 1*e*, a printer device 1*f*, a network interface 1*g*, an operating panel 1*h* or a document feeder device 1*m*.

The nonvolatile memory 1*d* is a nonvolatile memory such as an EEPROM or a flash memory that can rewrite data. The ROM 1*c* is a memory for only reading use. Though a ROM is included in a nonvolatile memory in general, the EEPROM, the flash memory or the like is distinguished from the ROM in this embodiment by referring the former as the "nonvolatile memory 1*d*" while by referring the latter as the "ROM 1*c*".

The nonvolatile memory 1*d* stores programs and data for realizing functions of a general control portion 101, a user authentication portion 102, a device structure detection portion 103, a notification target determination portion 104, a new function notification portion 105, an image processing portion 106, a database control portion 1K1 and a program control portion 1K2 as shown in FIG. 4. These programs are executed by the CPU 1a. A part of the whole of these programs or data may be stored in the ROM 1c. Alternatively, a part or the whole of the functions shown in FIG. 4 may be realized by the control circuit 1j.

The application program and the driver corresponding to the image forming device 1 are installed in the terminal device 2 as described above. Furthermore, an application program for electronic mail and an application program for file transmission are also installed. As the terminal device 2, a personal computer, a workstation, a personal digital assistant (PDA) or the like is used.

Figure 8:
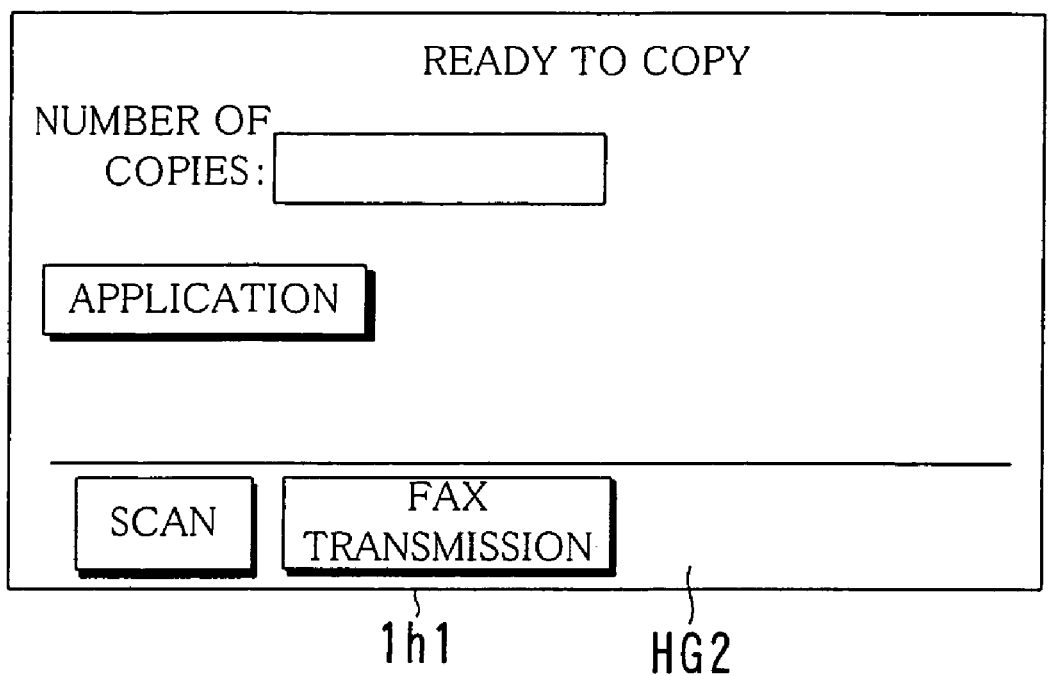
FIG. 8 shows an example of a copy job reception screen.
Figure 9:
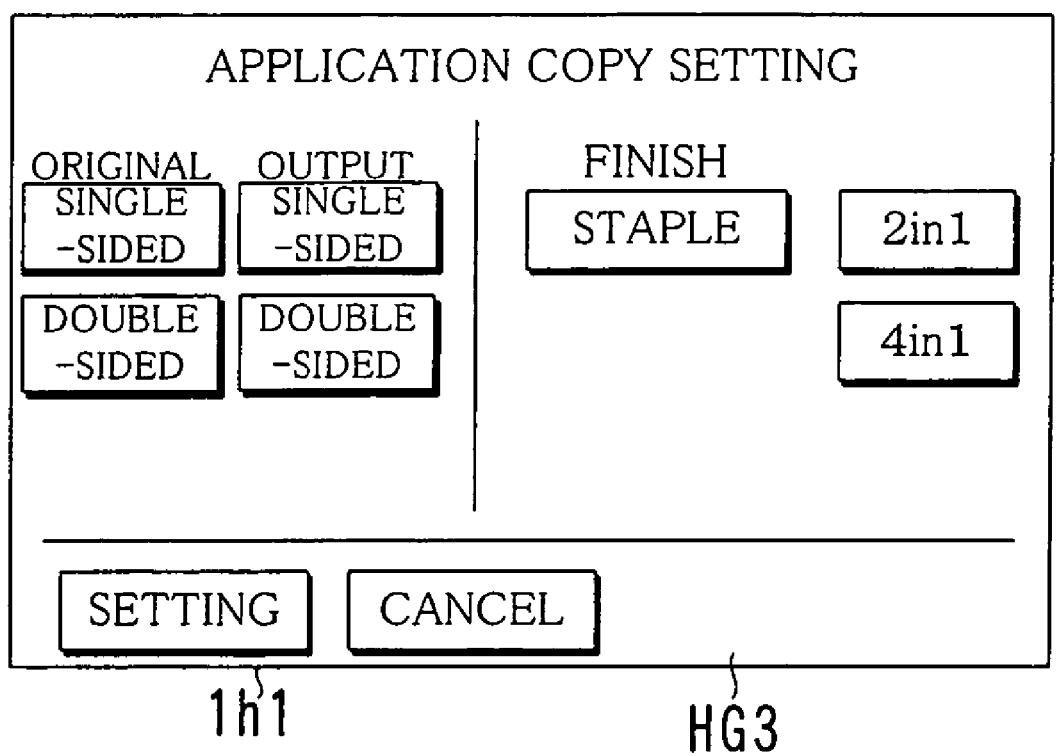
FIG. 9 shows an example of an application copy setting screen.
Figure 10:
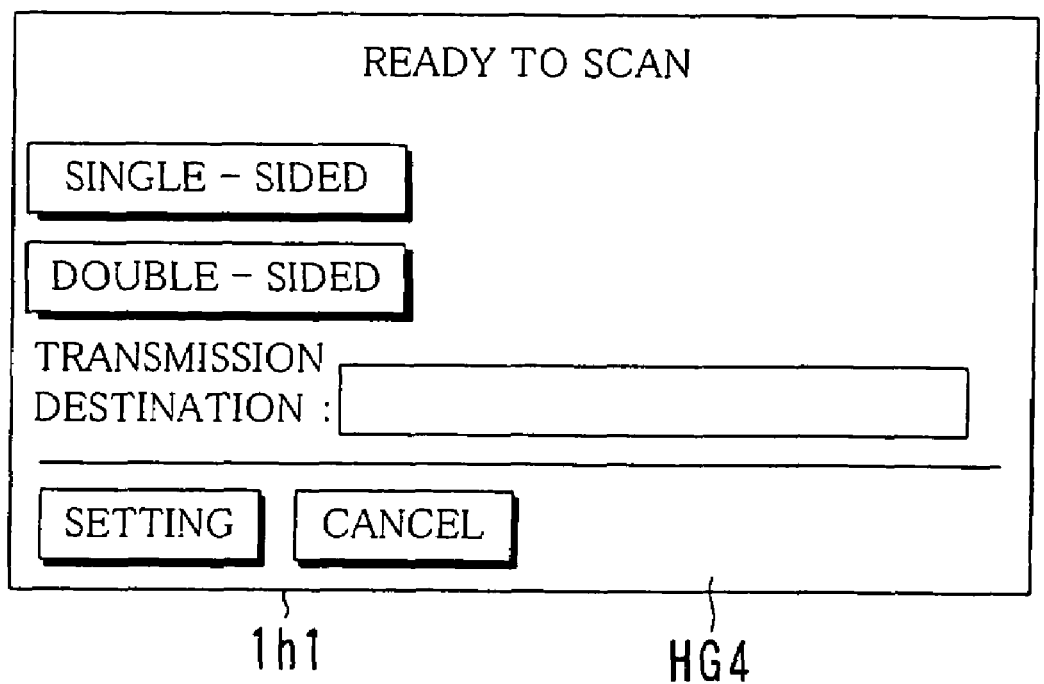
FIG. 10 shows an example of a scan job reception screen.

FIG. 5 shows an example of a user information database DB1, FIG. 6 shows an example of a user job history database DB2, FIG. 7 shows an example of a log-in screen HG1, FIG. 8 shows an example of a copy job reception screen HG2, FIG. 9 shows an example of an application copy setting screen HG3, FIG. 10 shows an example of a scan job reception screen HG4.

Hereinafter, the process of each portion shown in FIG. 4 will be described with an example of the image forming device 1 equipped with standard functions and expandable functions (optional functions), which are:

(a) standard functions such as scanning of a double-sided original, single-sided printing, 2 in 1 printing, and 4 in 1 printing; and (b) optional functions such as double-sided printing, stapled finish, sorting, booklet finish, FAX transmission, box, and test printing.

Note that the "test printing" function means a function of producing only one copy for checking finished state prior to produce (print or copy) plural copies. It may be also called a "test print function". The "booklet finish" function means a function of bonding and folding a printed matter at the middle portion to be a booklet, a pamphlet or a magazine. It may be also called a "magazine bonding function". The "box" function is a function for each user to store or manage his or her document data such as an image file in a memory area called a "box" or a "personal box" that is assigned to each user. The box corresponds to a "folder" or a "directory" in a personal computer.

The database control portion 1K1 shown in FIG. 4 stores and manages a database such as a user information database DB1 and a user job history database DB2. The user information database DB1 stores information including a user ID (a user account), a password and an electronic mail address for communication of each user who can use the image forming device 1 as shown in FIG. 5. The user job history database DB2 stores information about jobs performed by the image forming device 1 as shown in FIG. 6. Contents of each item will be described later.

The program control portion 1K2 manages programs installed in the image forming device 1. A program for expanding functions is also controlled by the program control portion 1K2.

The general control portion 101 controls the entire of the image forming device 1 so that a basic process is performed. For example, it controls so that a predetermined screen is displayed at a predetermined timing, controls so that an operation performed by the user are accepted, and controls so that a job such as scanning, printing or data transmission is performed in accordance with the operation.

The user authentication portion 102 authenticates that a person who is going to use the image forming device 1 is a regular user. This authentication is performed by the following procedure. If nobody is operating the image forming device 1 directly, a log-in screen HG1 as shown in FIG. 7 is displayed on the display device 1h1. A user who wants to use the image forming device 1 operates the operating button unit 1h2 to enter his or her user ID and password. Then, the general control portion 101 accepts the user ID and the password, and instructs the user authentication portion 102 to perform the user authentication process.

The user authentication portion 102 extracts a record having the same value as the entered user ID from the user information database DB1 shown in FIG. 5. Then, it verifies the entered password with the password of the record. If the passwords are identical to each other, it is authenticated that the user is a regular user. If the passwords are not identical to each other, it is decided that the user is an irregular user. If there is no record having the same value of user ID in the user information database DB1 as the entered user ID, it is also decided that the user is an irregular user. The user who is decided to be an irregular user cannot use the image forming device 1.

A user who received the authentication indicating a regular user is permitted to use the image forming device 1. Namely, the user can log in the image forming device 1. Then, the general control portion 101 displays the copy job reception screen HG2 shown in FIG. 8 on the display device 1h1. The user can make the image forming device 1 performs a desired process by doing a predetermined operation.

For example, if the user wants to copy an original, the user sets the original to the document feeder device 1m. Then, the user enters the number of copies to be produced and presses a "start" button in the operating button unit 1h2 (see FIG. 3).

If the user wants to do an application copy, the user presses an "application" button on the copy job reception screen HG2. Then, the general control portion 101 makes display device 1h1 display the application copy setting screen HG3 as shown in FIG. 9. The user can set the application copy to be performed by operating a button on this application copy setting screen HG3. For example, if the user wants to copy a double-sided original on a single side of a sheet of paper, the user presses and selects the "double-sided" button in the "original" column and the "single-sided" button in the "output" column. If the user wants to staple the obtained printed matter for a finish by the copying process, the user presses and selects the "staple" button. If the user wants to scale two pages of an original down into one page for printing (2 in 1 print), the user presses and selects a "2 in 1" button. Then, when the desired setting is completed, the user presses "setting" button to go back to the copy job reception screen HG2 and presses the "start" button in the operating button unit 1h2.

If the user wants to scan an original, the user presses a "scan" button. Then, the screen displayed on the display device 1h1 changes from the copy job reception screen HG2 to the scan job reception screen HG4 as shown in FIG. 10. Then, the user designates the single-sided original or the double-sided original, designates a destination device to which the image data of the scanned image is to be sent, and presses the "start" button in the operating button unit 1h2.

When the user did this operation, the general control portion 101 generates job data for executing a process corresponding to the operation and registers it in a job queue (hereinafter, referred to as a "queue"). When the job comes to the first position of the queue, the job is executed in accordance with the job data. A history (a log) of the executed job is registered in the user job history database DB2 shown in FIG. 6.

For example, when "3" is entered in the text box of the "number of copies" on the copy job reception screen HG2 and the "double-sided" button in the "original" column, the "single-sided" button in the "output" column on the application copy setting screen HG3 as well as the "2 in 1" button is pressed for generating the job, the scanner 1e scans images on the upper side and the lower side of original sheets fed by the document feeder device 1m. The image processing portion 106 scales down these images by a predetermined magnification, and the printer device 1f organizes the images on the upper side and the lower side of one original sheet into one set, which is printed on one side of each of three sheets of papers and is ejected to the output tray.

If "sato@ . . . .co.jp" is entered in the text box of the "transmission destination" on the scan job reception screen HG4 and the "single-sided" button is pressed for generating the job, the scanner 1e scans images on the upper side of original sheets fed by the document feeder device 1m. The image processing portion 106 converts these images into an image file of a predetermined format (for example, PDF, TIFF or the like). The general control portion 101 controls the network interface 1g or the like so as to attach this to electronic mail and to send it to an electronic mail address, "sato@ . . . .co.jp." Note that if an IP address is set as the transmission destination, it is possible to send the image file to the device to which the IP address is assigned by the FTP.

After executing the job, information about the job is registered in the user job history database DB2 shown in FIG. 6. One record corresponds to one job in FIG. 6. The "job ID" is identification information for identifying the job of the record.

The "user ID" is the user ID of the user who requested the job. The "application" indicates an application that is used for executing the job or a type of the job. The "number of original sheets" indicates the number of original sheets to be processed in the job. The "number of copies" indicates the number of copies in the printing or the copying job. The "sides of original" indicates whether the original to be processed in the job is a double-sided original or a single-sided original. The "sides of output" indicates whether the image is printed or duplicated on both sides or on one side of a sheet of paper.

The "sort" indicates whether the printed matter is sorted for each copy before being ejected to the output tray when print of plural copies is set. The "finish" indicates whether stapling, 2 in 1 print, 4 in 1 print or the like is performed or not.

The "execution result" indicates information about a result of execution of the job. When the job is executed correctly in accordance with the process condition designated by the user on the copy job reception screen HG2, the application copy setting screen HG3 or the scan job reception screen HG4, a value of "0: normally completed" is stored. If a part or the entire of the process condition was changed for executing the job, a value of "1: forced cancellation execution" is stored.

As described above, the sorting function or the stapling function for example is not a standard functions but an optional function in the image forming device 1 of this embodiment. If the user designates one of these functions on the application copy setting screen HG3 or the scan job reception screen HG4 although the function is not added to the image forming device 1 yet, the image forming device 1 cancels the designation of the function forcibly (i.e., ignores) for executing the job. In this case, the value of "1: forced cancellation execution" is stored in the "execution result" of the job. Note that if the forced cancellation is performed, information indicating the condition designated by the user is stored instead of the real process condition for items of "sort" and "finish".

In addition, if the printed image on the printed matter becomes faint due to running out of toner or the like although the job was executed in accordance with the process condition designated by the user, a value of "2: near empty" is stored in the "execution result" of the job. The determination of "near empty" or not may be performed by the image forming device 1 detecting quantity of remained toner or by an administrator of the image forming device 1 checking the printed matter.

If the execution of the job ends in failure, a value of "3: abnormal end" is stored in the "execution result" of the job. In this case, a value indicating the cause of the failure is stored in the "cause of abnormal end".

Note that the user can use the image forming device 1 from a distant location by using the terminal device 2. In this case, a screen that is similar to the log-in screen HG1 shown in FIG. 7 is displayed on a display of the terminal device 2, and the user operates a keyboard or a mouse to enter his or her user ID and password. Similarly to the case of direct operation of the image forming device 1, the entered user ID and password are accepted by the general control portion 101 shown in FIG. 4, and the process of the user authentication is performed by the user authentication portion 102. The user of the terminal device 2 can use the image forming device 1 after the user authentication and log-in of the image forming device 1. Then, the user can make the image forming device 1 perform the print process (network printing) or the like for printing an original or the like generated by a word processor, drawing software or the like in the terminal device 2.

Figure 11:
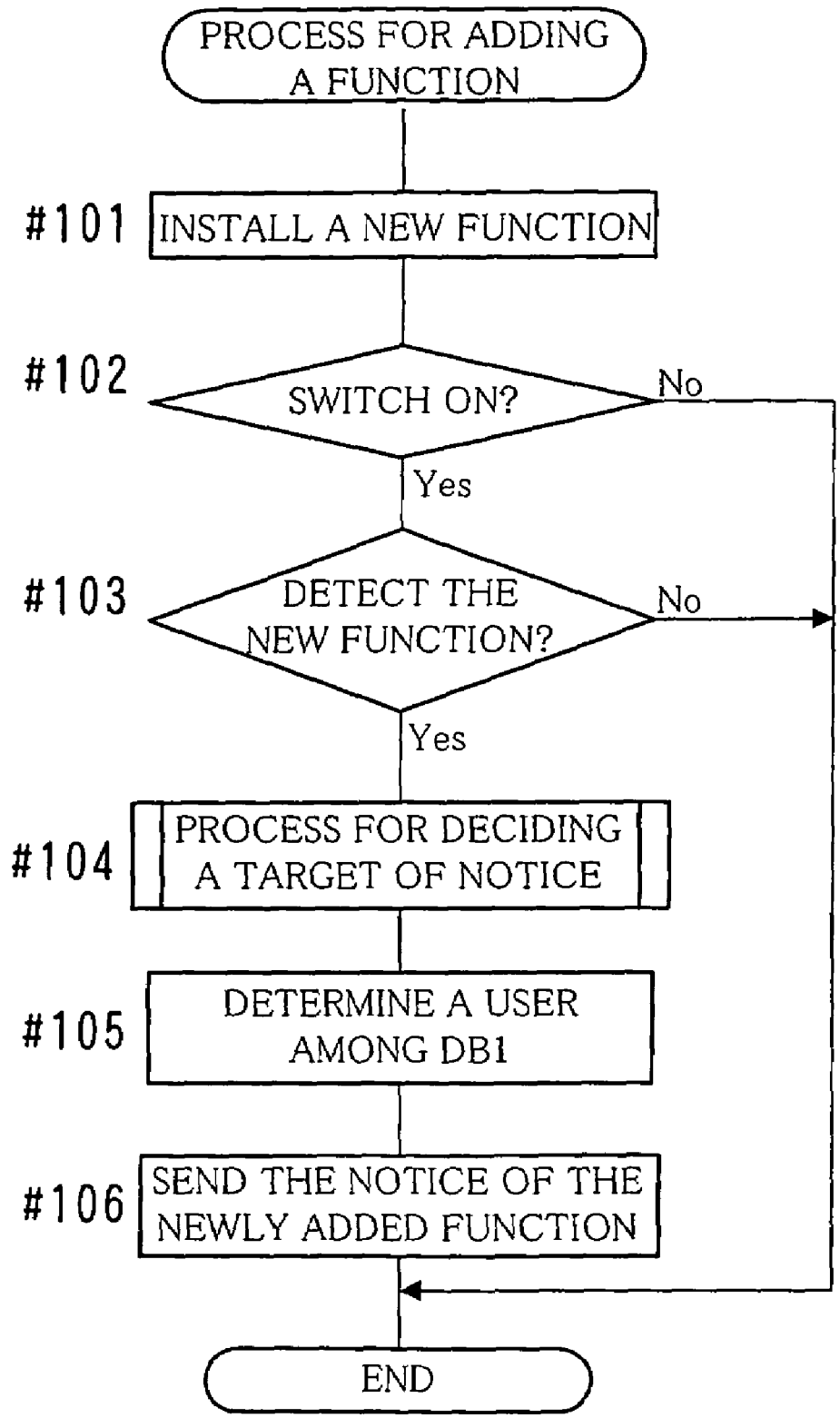
FIG. 11 is a flowchart showing an example of a flow of a process for adding a function.
Figure 13:
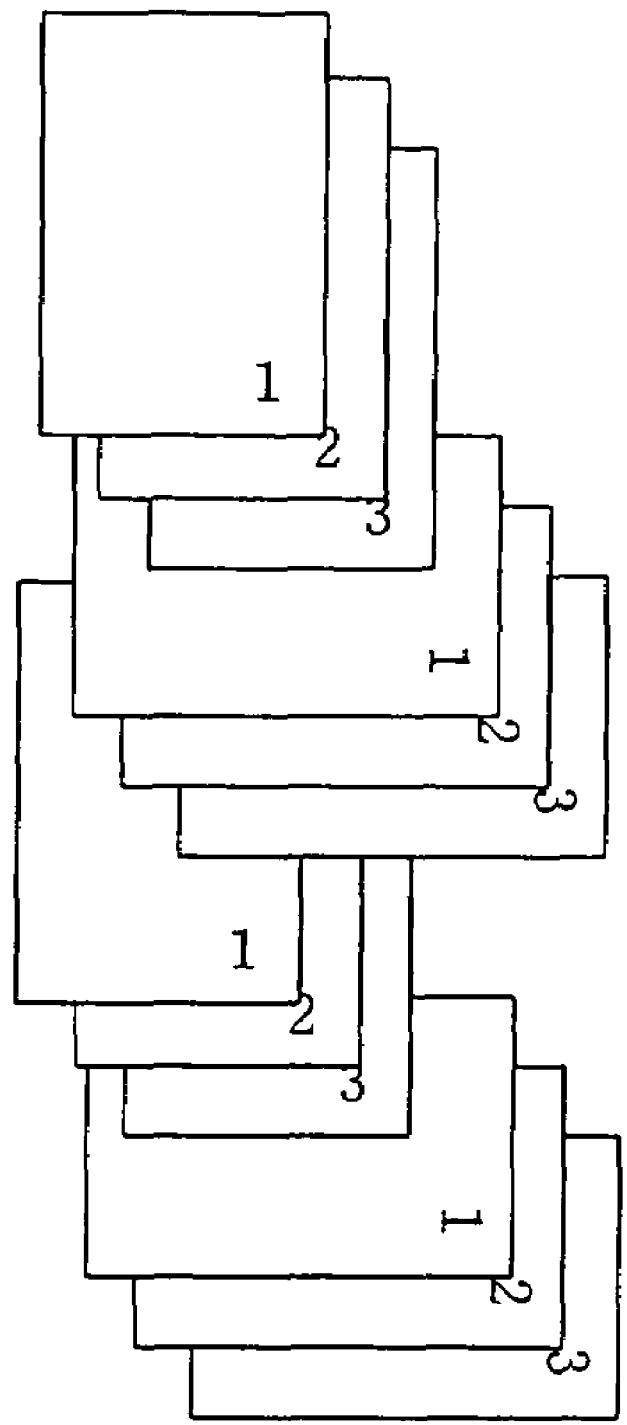
FIG. 13 shows an example of an alternate sorting.

FIG. 11 is a flowchart showing an example of a flow of a process for adding a function, FIG. 12 is a flowchart showing an example of a flow of a process for deciding a target of notice, and FIG. 13 shows an example of an alternate sorting.

The device structure detection portion 103 shown in FIG. 4 detects a new function that was added to the image forming device 1. In addition, it detects supplementation of toner. Then, the notification target determination portion 104 determines a user to whom the notice of addition of the new function or the supplementation of toner should be sent. Then, the new function notification portion 105 sent a message including the notice as electronic mail to an electronic mail address of the determined user. The series of processes is performed by the procedure as shown in FIG. 11, for example.

An administrator of the image forming device 1 attaches or installs hardware or software that is necessary for realizing the new function to the image forming device 1 (#101 in FIG. 11). Otherwise, the administrator adds (supplements) toner. It is desirable to turn off the power of the image forming device 1 when attaching the hardware. When the work is finished, the power of the image forming device 1 is turned on or the image forming device 1 is activated again if necessary (Yes in #102).

Then, the device structure detection portion 103 of the image forming device 1 recognizes the new hardware or software by comparing the past configuration of the image forming device 1 and the present configuration of the image forming device 1, so as to detect the new function (Yes in #103). For example, it is detected by comparing a model number of the hardware that is embedded or attached externally, or a type number or a version number or installed software.

The notification target determination portion 104 determines a user to whom the notice of the newly added function should be sent by the procedure as shown in FIG. 12, for example (#104).

If it is detected that the double-sided print function is added (namely, if the double-sided print unit is attached) (Yes in #112), it is determined that the notice of the addition of this function should be sent to users who have ever made the job for printing a double-sided original on one side of a sheet of paper (#113).

If it is detected that the staple finish function is added (namely, if a stapling finisher is attached) (Yes in #114), it is determined that the notice of the addition of this function should be sent to users who have ever made the job for producing (printing or copying) plural copies for one set of originals or the job in which stapling finish was designated as the process condition but later it is canceled forcibly (#115).

If it is detected that toner is supplemented (Yes in #116), it is determined that the notice of the addition of this function should be sent to users who have ever made the job for printing or copying in the state of "near empty" (#117). Note that there is a case where toner is supplemented by changing a toner cartridge and another case where toner is supplemented by replenishing toner into a toner tank directly.

If it is detected that the sorting function is added (Yes in #118), it is determined that the notice of the addition of this function should be sent to users who have ever made the job for producing (printing or copying) plural copies for one set of originals (#119).

Note that the sorting of a printed matter can be performed by one of the following two methods. In one method, the printed matter is ejected onto plural output trays on one by one set basis. In another method, the printed matter is ejected in different orientations (horizontal and vertical orientations) alternately on one by one copy (set) (called an "alternate sorting" or the like) as shown in FIG. 13. If the sorting function by the former method is added, an additional output tray is provided to the image forming device 1, and software for controlling the additional output tray and the existing output trays is installed. If the sorting function by the latter method is added, software of image processing for rotating an image of image data stored in the RAM 1b (see FIG. 2) by 90 degrees is installed. In addition, a paper feed unit for feeding sheets of paper of the same size in the horizontal and the vertical orientations is added if necessary.

If it is detected that the booklet finish function is added (Yes in #120), it is determined that the notice of the addition of this function should be sent to users who have ever made the job for printing or copying by 2 in 1 or 4 in 1 form (#121). Note that the booklet finish function can be added by setting up an additional hard disk drive or a memory so as to ensure a memory capacity larger than a predetermined value and by installing a program for sorting images of an original.

If it is detected that the FAX function is added (namely, if a program supporting a FAX modem or a FAX program is added) (Yes in #122), it is determined that the notice of the addition of this function should be sent to users who have ever made the job for scanning (#123).

If it is detected that the box function is added (namely, if a mass storage hard disk drive is added and a file management program is installed) (Yes in #124), it is determined that the notice of the addition of this function should be sent to users who have ever made the job for scanning (#125). Thus, it becomes convenient for a user who had to scan a large quantity of original and to send the same by dividing it to plural communication times so as to satisfy a limitation of a traffic capacity. Namely, according to this function, such a user can store data of a scanned image of an original in his or her box and ask the party on the other end to download the data so as to realize a work that is equivalent to the conventional one.

If it is detected that the test printing function is added (namely, if a program for test printing is installed) (Yes in #126), it is determined that the notice of the addition of this function should be sent to users who have ever made the job for printing or copying originals of the same number of sheets successively (#127).

With reference to FIG. 11 again, the notification target determination portion 104 determines a user among users registered in the user information database DB1 shown in FIG. 5 to whom the notice of the function added this time in accordance with the result of the process shown in FIG. 12 and the user job history database DB2 shown in FIG. 6 (#105).

For example, if the double-sided print function is added, it is determined by the Step #104, i.e., the determination process shown in FIG. 12 that the notice should be sent to users who have ever made the job for printing a double-sided original on one side of sheet of paper. Therefore, it is determined that the notice should be sent to users who made the jobs having job IDs of "J005" and "J007", namely users whose user IDs are "102" and "100" by referring to the user job history database DB2 shown in FIG. 6.

Similarly in accordance with the user job history database DB2 and the result of the determination process shown in FIG. 12, if the staple function is added, it is determined that the notice should be sent to users who made the job for producing (printing or copying) plural copies, i.e., jobs having job IDs of "J003", "J005", "J007" and "J010". If toner is supplemented, it is determined that the notice should be sent to a user who made the job having the execution result of "2: near empty", i.e., the job having the job ID of "J011".

If the booklet finish function is added, it is determined that the notice should be sent to users who made the jobs for the 2 in 1 or 4 in 1 output, i.e., the jobs having job IDs of "J001" and "J008". If the FAX function is added, it is determined that the notice should be sent to users who made the jobs for scanning, i.e., jobs having job IDs of "J004", "J006" and "J012". It is similar for the case where the box function is added. If the test printing function is added, it is determined that the notice should be sent to a user who made the job consecutively for copying or printing originals of the same number of sheets, i.e., a user who made both jobs having the job ID of "J009" and "J010".

The new function notification portion 105 refers the user information database DB1 shown in FIG. 5 and sends the notice of the newly added function or supplementation of toner to electronic mail addresses of users determined by the notification target determination portion 104 by electronic mail (#106). Note that along with the latter notice it is possible to send a message apologizing for the pale print before.

The notice received from the image forming device 1 is displayed on a display device of the terminal device 2. Thus, the user can know the newly added function and extend applications of the image forming device 1.

Figure 14:
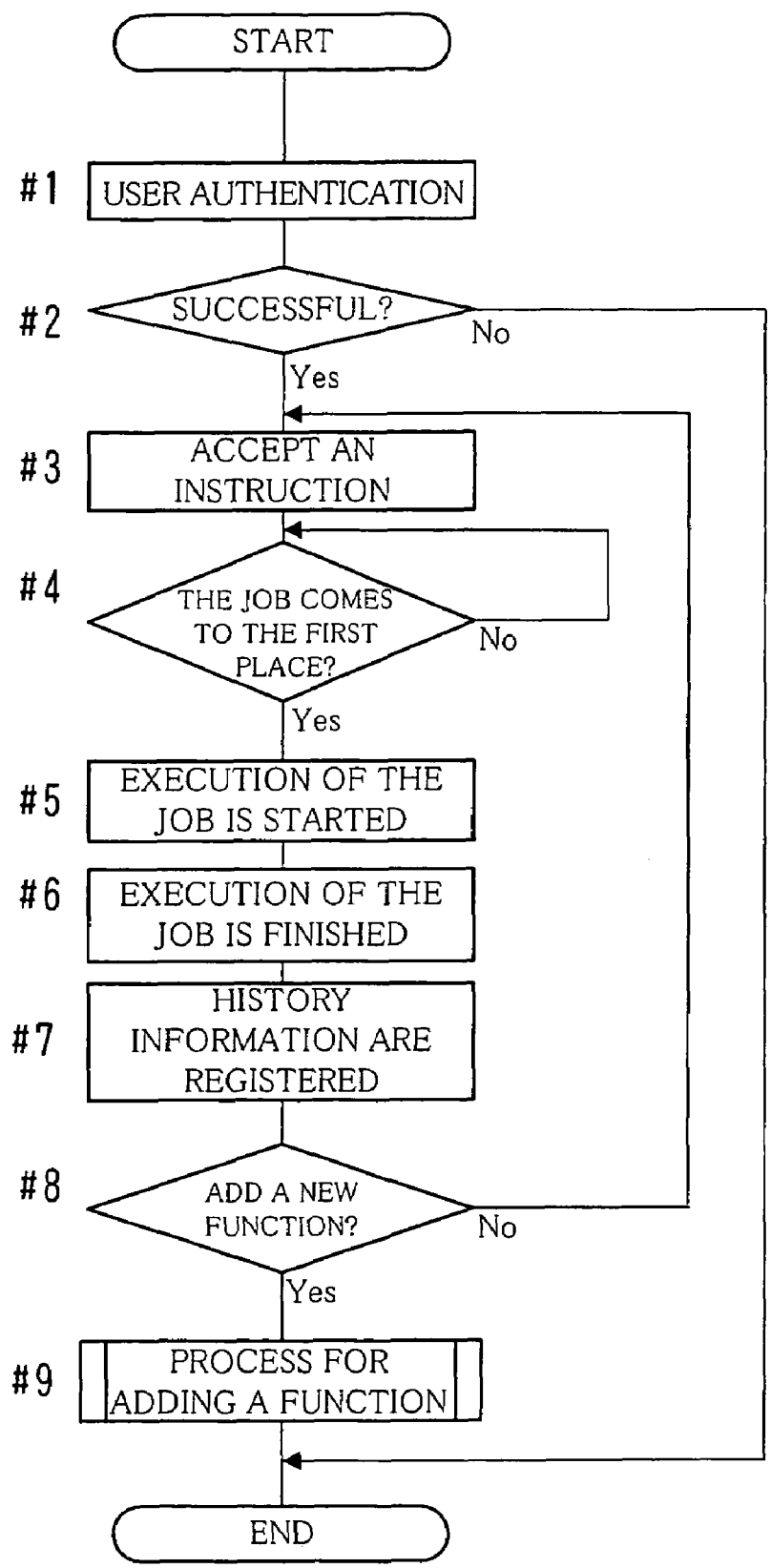
FIG. 14 is a flowchart showing a general process flow of the image forming device.

FIG. 14 is a flowchart showing a general process flow of the image forming device 1. Next, a flow of a general process of the image forming device 1 will be described with reference to a flowchart shown in FIG. 14.

When accepting the entry of the user ID and the password of the user who intends to use the image forming device 1, the image forming device 1 refers the user information database DB1 shown in FIG. 5 and performs the authentication about whether the user is a regular user or not (#1). If the user receives the authentication indicating the user is a regular user (Yes in #2), the user can issue an instruction for performing a desired process to the image forming device 1. The entry of the user ID or the like and the instruction for the process are performed while the user views the screen displayed on the display device 1*h*1 (see FIGS. 7-10). The user can also perform the process by using the terminal device 2 from a remote place.

When accepting the instruction for the process, the image forming device 1 generates a job for performing a process desired by the user and registers the job in the queue (#3). When the job comes to the first place in the queue (Yes in #4), execution of the job is started (#5).

When the execution of the job is finished (#6), the job ID of the job, the user ID of the user who made the instruction, the execution condition this time (a type (an application) such as print, copy or scan, the number of original sheets, the number of copies, single or double sides of the original, single or double sides of the output, sorting or not, finish or the like), a result of execution, a cause of an abnormal end if it happened and other information are registered in the user job history database DB2 shown in FIG. 6 (#7). If there is an execution condition that was canceled forcibly, the execution condition is also registered.

Then, in Step #3 again, other instruction for a process desired by the user is accepted. If the user logs out, the process goes back to Step #1 for waiting a user ID and a password.

When adding a new function or supplementing toner to the image forming device 1 (Yes in #8), the process for adding a function is performed (#9). The procedure of this process is already described with reference to FIGS. 11 and 12. According to this process, the notice is sent only to users who can receive a benefit as a result of the addition of the function or supplementation of toner.

After the function is added, the power of the image forming device 1 is turned on or it is restarted if necessary. Then, the process goes back to Step #1 for waiting an input of a user ID and a password.

According to this embodiment, the notice is sent only to users who can receive a benefit as a result of the addition of the function or supplementation of toner. Therefore, it is possible to be more efficient than before about notification of a change in the image forming device 1. In addition, the user can receive only a notice that is relevant to the matter that is necessary for the user promptly (in real time substantially).

Although the notification to the user is performed by sending electronic mail to the electronic mail address of the user in this embodiment, it is not limited to this. For example, it is possible to perform the notification by displaying a message on the display device 1*h*1 when the user to be notified logged in the image forming device 1. It is also possible to perform the notification by sending a message by FAX to other MFP placed near the user. The MFP placed near the user can be searched by the following method, for example. Usually, in an organization such as a company, devices that are installed in the same department belong to the same sub network. Therefore, it is possible to search a MFP that belongs to the same sub network as the terminal device 2 by comparing the IP address and the sub net mask of the terminal device 2 of the user with IP addresses and sub net masks of MFPs. It is also possible to search the MFP by registering the MFPs located near the each of users in the database and by using the database.

Although an example is described in this embodiment in which a function such as the double-sided print, the stapled finish, the sorting, the booklet finish, the FAX transmission, the box or the test printing is added, the present invention can be applied to a case in which other function is added.

For example, there is a case where an image forming device 1 is equipped with a confidential print function as a standard function in which a print process is not performed and pended when the image forming device 1 receives print data for network printing from the terminal device 2 or the like and later the print process is started when the user enters a preset password by operating the operating panel of the image forming device 1. In this case, it is possible to send a notice of the additional function to a user who has ever used the confidential print function. It is also possible to send a notice to a user who has ever used the confidential print function or a user who needs the added function when a water mark function is added, which is for printing a water mark on a duplicated material by using a paper sheet with a water mark such as "COPY" for printing in the image forming device 1 and then duplicating by using the printed matter as an original.

In addition, it is also possible to send a notice to a user who is determined to satisfy a predetermined condition when a consumable item except toner is supplemented. For example, when staples are supplemented in the image forming device 1 that is equipped with the stapling finish function after running out of the staples, it is possible to send a notice indicating that staples have been supplemented to a user who made a job in which stapling is designated as the process condition but the stapling was not completed.

Furthermore, the structure of the entire or a part of the image forming device 1, the process contents, the process order, the process condition of the job, the structure of the database, or the method of determining the destination of the notice can be modified if necessary in accordance with the sprit of the present invention.

The present invention can be used appropriately for an image processor such as an MFP that is used by many people and has high expandability.

The present invention also relates to a computer-readable medium having a computer program product for use in an image processor that executes a job of a process, as disclosed and described herein.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processor for executing a job of a process related to an image in accordance with a request given by a user, the image processor comprising:
    a storage portion for storing a history of execution condition information for each job, the execution condition information indicating an execution condition of the job in relationship with user identification information for distinguishing the user who made the instruction;
    a status change detection portion for detecting a change in a state of the image processor;
    a notification target determination portion for determining a notification target user who is a user to be notified of the change in accordance with the history of execution condition information and the user identification information associated with the history stored in the storage portion; and
    a notification portion for notifying the change to the determined notification target user.

2. The image processor according to claim 1, wherein the change is addition of a new function to the image processor, and the notification target determination portion determines a user who needs the added function as the notification target user.

3. The image processor according to claim 2, further comprising an image reading portion for reading images of a double-sided original and a printing portion for printing the images read by the image reading portion on a single side of sheets of paper, wherein if the added function is a function for printing images on both sides of sheets of paper by the printing portion, the notification target determination portion determines a user who has ever made the job for reading images of a double-sided original by the image reading portion and printing the image by the printing portion as the user who needs the function.

4. The image processor according to claim 2, further comprising a printing portion for producing a printed matter by printing images on sheets of paper, wherein if the added function is a function for stapling one copy of printed matter that is produced by the printing portion, the notification target determination portion determines a user who has ever made the job for producing a printed matter containing a copy consisting of plural sheets of paper by the printing portion as the user who needs the function.

5. The image processor according to claim 2, further comprising a printing portion for printing images on sheets of paper, wherein if the added function is a function for printing in a form for stapling sheets at the center, the notification target determination portion determines a user who has ever made the job for printing plural images of pages of an original containing plural pages arranging the plural images in one sheet of paper by the printing portion as the user who needs the function.

6. The image processor according to claim 2, further comprising an image reading portion for reading an image of an original, wherein if the added function is a function for sending by FAX the image read by the image reading portion, the notification target determination portion determines a user who has ever made the job for reading an image of an original by the image reading portion as the user who needs the function.

7. The image processor according to claim 2, further comprising an image reading portion for reading an image of an original and an image data transmission portion for sending image data of the image read by the image reading portion to other device, wherein if the added function is a function for storing image data in a storage area assigned to each user, the notification target determination portion determines a user who has ever made the job for sending image data of the image read by the image reading portion to other device by the image data transmission portion as the user who needs the function.

8. The image processor according to claim 2, further comprising a printing portion for print an image of an original on a sheet of paper, wherein if the added function is a function for controlling the printing portion to print first one of the plural copies of a set of original and to print the rest of the plural copies when receiving an instruction from a user, the notification target determination portion determines a user who has ever made the job for printing the same original two or more times consecutively as the user who needs the function.

9. The image processor according to claim 2, wherein the execution condition information indicates an execution condition designated by a user as the execution condition, and the notification target determination portion determines a user who has ever tried to make the job for performing a process using the function before the function is added as the user who needs the function.

10. The image processor according to claim 9, wherein the execution condition information indicates an execution condition for stapling or not stapling a printed matter as the execution condition, and if the added function is a function for stapling a copy of printed matter obtained by the printing portion, the notification target determination portion determines a user who has ever tried to make the job having the print condition of stapling a printed matter before the function is added as the user who needs the function.

11. The image processor according to claim 1, wherein the change is supplementation of a consumable item of the image processor, and the notification target determination portion determines a user who made the job that was executed when remaining quantity of the consumable item is less than a predetermined quantity as the notification target user.

12. A method for notifying a user of a status change in an image processor which performs a job of a process related to an image in accordance with an instruction given by a user, the method comprising:
 storing a history of execution condition information that indicates an execution condition of the job in relationship with user identification information for distinguishing the user who made the instruction for each job;
 detecting a change in a state of the image processor;
 determining a notification target user who is a user to be notified of the change in accordance with the history of execution condition information and the user identification information associated with the history stored in the storage portion; and
 notifying the change to the determined notification target user.

13. The method for notifying a status change in an image processor according to claim 12, wherein the change is addition of a new function to the image processor, and a user who needs the added function is determined as the notification target user.

14. The method for notifying a status change in an image processor according to claim 13, wherein the execution condition information indicates an execution condition designated by a user as the execution condition, and a user who has ever tried to make the job for performing a process using the function before the function is added is determined as the user who needs the function.

15. A computer-readable medium having stored thereon a computer program product for use in an image processor that executes a job of a process related to an image in accordance with an instruction given by a user, the computer program product makes the image processor execute:
 a first step for storing a history of execution condition information for each job, that indicates an execution condition of the job in relationship with user identification information for distinguishing the user who made the instruction every time when the job is performed;
 a second step for detecting a change in a state of the image processor;
 a third step for determining a notification target user who is a user to be notified of the change in accordance with the history of execution condition information and the user identification information associated with the history stored in the storage portion; and
 a fourth step for notifying the change to the determined notification target user.

16. The computer-readable medium having stored thereon a computer program product according to claim 15, wherein the change is addition of a new function to the image processor, and a user who needs the added function is determined as the notification target user in the third step.

17. The computer-readable medium having stored thereon a computer program product according to claim 16, wherein the execution condition information indicates an execution condition designated by a user as the execution condition, and a user who has ever tried to make the job for performing a process using the function before the function is added is determined as the user who needs the function in the third step.

* * * * *

UNITED STATES PATENT AND TRADEMARK OFFICE
CERTIFICATE OF CORRECTION

PATENT NO. : 7,639,385 B2 Page 1 of 1
APPLICATION NO. : 11/026085
DATED : December 29, 2009
INVENTOR(S) : Nakata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Ninth Day of November, 2010

David J. Kappos
*Director of the United States Patent and Trademark Office*